United States Patent

Omori et al.

Patent Number: 5,887,142
Date of Patent: Mar. 23, 1999

[54] SYSTEM FOR HANDLING OF RETURN RECEIPT CONFIRMATIONS OF PROCESSING WHEN TRANSFERRING DATA BETWEEN THE PSTN AND A PRIVATE NETWORK

[75] Inventors: Seiji Omori; Naoki Sugawara, both of Yokohama, Japan

[73] Assignee: Canon Kabushiki Kaisha, Tokyo, Japan

[21] Appl. No.: 688,274

[22] Filed: Jul. 29, 1996

[30] Foreign Application Priority Data

Jul. 13, 1995  [JP]  Japan .................................. 7-194985

[51] Int. Cl.⁶ .............................. H04L 12/06; H04L 12/66
[52] U.S. Cl. ................................. 395/200.67; 395/200.57
[58] Field of Search ......................... 395/200.57, 200.58, 395/200.59, 200.67; 358/434, 435, 436

[56] References Cited

U.S. PATENT DOCUMENTS

| | | | |
|---|---|---|---|
| 4,914,619 | 4/1990 | Harris et al. ........................ | 395/200.57 |
| 5,123,089 | 6/1992 | Beilinski et al. ................... | 395/200.67 |
| 5,432,618 | 7/1995 | Monnot et al. ..................... | 358/435 |
| 5,513,126 | 4/1996 | Harkins et al. .................... | 395/200.58 |
| 5,555,307 | 9/1996 | Le Corre et al. .................. | 380/18 |
| 5,566,230 | 10/1996 | Cairo .................................. | 379/93.07 |
| 5,666,489 | 9/1997 | Fite, Jr. et al. .................... | 395/200.58 |

*Primary Examiner*—Richard L. Ellis
*Attorney, Agent, or Firm*—Fitzpatrick, Cella, Harper & Scinto

[57] ABSTRACT

Upon reception of data via a PSTN (Public Switched Telephone Network), if a reception-result notification request is received from a transmitting apparatus, the state associated with the reception result as to whether or not the user of a terminal on the LAN has confirmed the data, is discriminated after completion of data reception and the disconnection of a line. Then, the discriminated information is notified by calling the transmitting apparatus. When the receiving apparatus is set to refuse notification by originating a call by itself, the information is notified in response to a call originated by the transmitting apparatus.

27 Claims, 9 Drawing Sheets

SYSTEM FOR HANDLING OF RETURN RECEIPT CONFIRMATIONS OF PROCESSING WHEN TRANSFERRING DATA BETWEEN THE PSTN AND A PRIVATE NETWORK

BACKGROUND OF THE INVENTION

The present invention relates to a data communication apparatus and method for transmitting/receiving data and, more particularly, to a data communication apparatus and method for performing data communications via a private network such as a local area network (LAN) or the like, and a public network such as a telephone line or the like.

Conventionally, for example, a facsimile apparatus having two interfaces, one of which is connected to a LAN and the other is connected to a public network such as a PSTN (Public Switched Telephone Network), an ISDN (Integrated Services Digital Network), or the like, is known. The facsimile apparatus performs facsimile transmission via the public network on the basis of a transmission request from a terminal on the LAN, and notifies the terminal on the LAN of data reception or distributes received data when it receives data via the public network.

However, in the conventional facsimile apparatus, the reception result information of which a transmitting facsimile apparatus is notified via the public network is information only associated with the facsimile apparatuses which have communicated with each other. That is, a reception station cannot be notified via the public network of information associated with the terminal on the LAN, e.g., information as to whether or not the apparatus can notify the terminal on the LAN of data reception or whether or not the apparatus can distribute data to the terminal.

SUMMARY OF THE INVENTION

It is an object of the present invention to provide a data communication apparatus and method, which can solve the above-mentioned problems.

It is another object of the present invention to provide a data communication apparatus and method, which can notify the transmitting side of information associated with reception data when the transmitting side requests such information.

It is still another object of the present invention to provide a data communication method and apparatus which can disconnect a line after data reception, and can connect the line again to be able to notify the states of reception data and a terminal on the LAN.

It is still another object of the present invention to provide a data communication apparatus and method, which can select whether the state of reception data is to be notified in response to a call originated by the data transmitting or receiving side.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiment of the present invention will be described in detail hereinafter with reference to the accompanying drawings.

Figure 1:
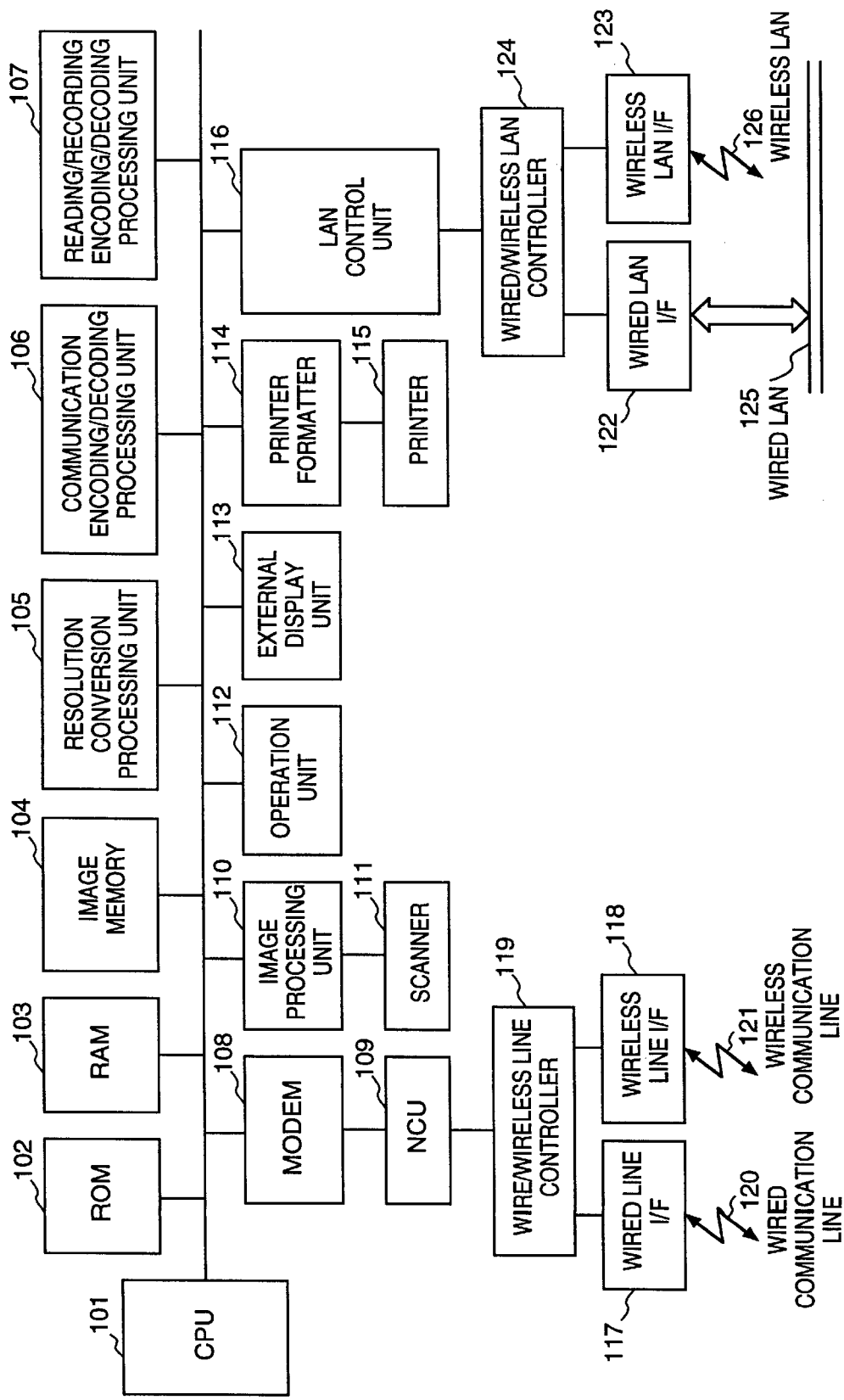
FIG. 1 is a block diagram showing the arrangement of a facsimile apparatus according to an embodiment of the present invention.

FIG. 1 is a block diagram showing the arrangement of a facsimile apparatus according to this embodiment. Referring to FIG. 1, a CPU 101 serves as a system controller, and controls the entire facsimile apparatus. The CPU 101 also has a function of measuring time for various purposes. A ROM 102 is a memory for storing the control program of the CPU 101. A RAM 103 comprises, e.g., an SRAM or the like, and stores program control variables and the like. The RAM 103 also serves as various work memories for storing setting values registered by an operator, management data of the apparatus, and the like. An image memory 104 comprises, e.g., a DRAM or the like, and stores image data.

A resolution conversion processing unit 105 performs resolution conversion control such as milli-inch conversion of raster data or the like. A communication encoding/decoding processing unit 106 performs encoding for a communication when the encoding method upon reading/recording is different from that upon communication. Furthermore, a reading/recording encoding/decoding processing unit 107 encodes/decodes image data upon reading and recording. A MODEM 108 modulates/demodulates a facsimile transmission/reception signal.

An NCU (network control unit) 109 has a function of sending a communication partner selection signal (dial pulses or a multi-frequency tone signal) onto a wired communication line 120 via a wired line i/f (interface) 117 or onto a wireless communication line 121 via a wireless line i/f 118. The NCU 109 also performs an automatic call termination operation by detecting a calling signal from the wired communication line 120 or the wireless communication line 121. Note that a wired/wireless line control unit 119 controls the above-mentioned wired line i/f 117 and the wireless line i/f 118.

A scanner 111 comprises, e.g., a CS image sensor, an original feeding mechanism, and the like. The scanner 111 optically reads an image on an original, and converts the read image into electrical image data. An image processing unit 110 performs correction processing of image data read by the scanner 111, and outputs high-definition image data. An operation unit 112 comprises a keyboard, and the like, and is used by an operator to perform various input operations. An external display unit 113 visually notifies a user of predetermined information using, e.g., an LCD, an LED, or the like.

A printer formatter 114 analyzes code data in, e.g., a printer description language and converts it into image data when, for example, file data output from, e.g., a workstation is to be printed out. A printer 115 records a received image or file data on a recording sheet. A wired LAN i/f 122 is an interface for connecting the facsimile apparatus to a wired LAN 125, and a wireless LAN i/f 123 is an interface for connecting the facsimile apparatus to a wireless LAN 126. These wired LAN i/f 122 and wireless LAN i/f 123 are controlled by a wired/wireless LAN control unit 124. A LAN control unit 116 performs data processing and data control so as to exchange data with a server or terminal on the wired LAN 125 or the wireless LAN 126.

Figure 2:
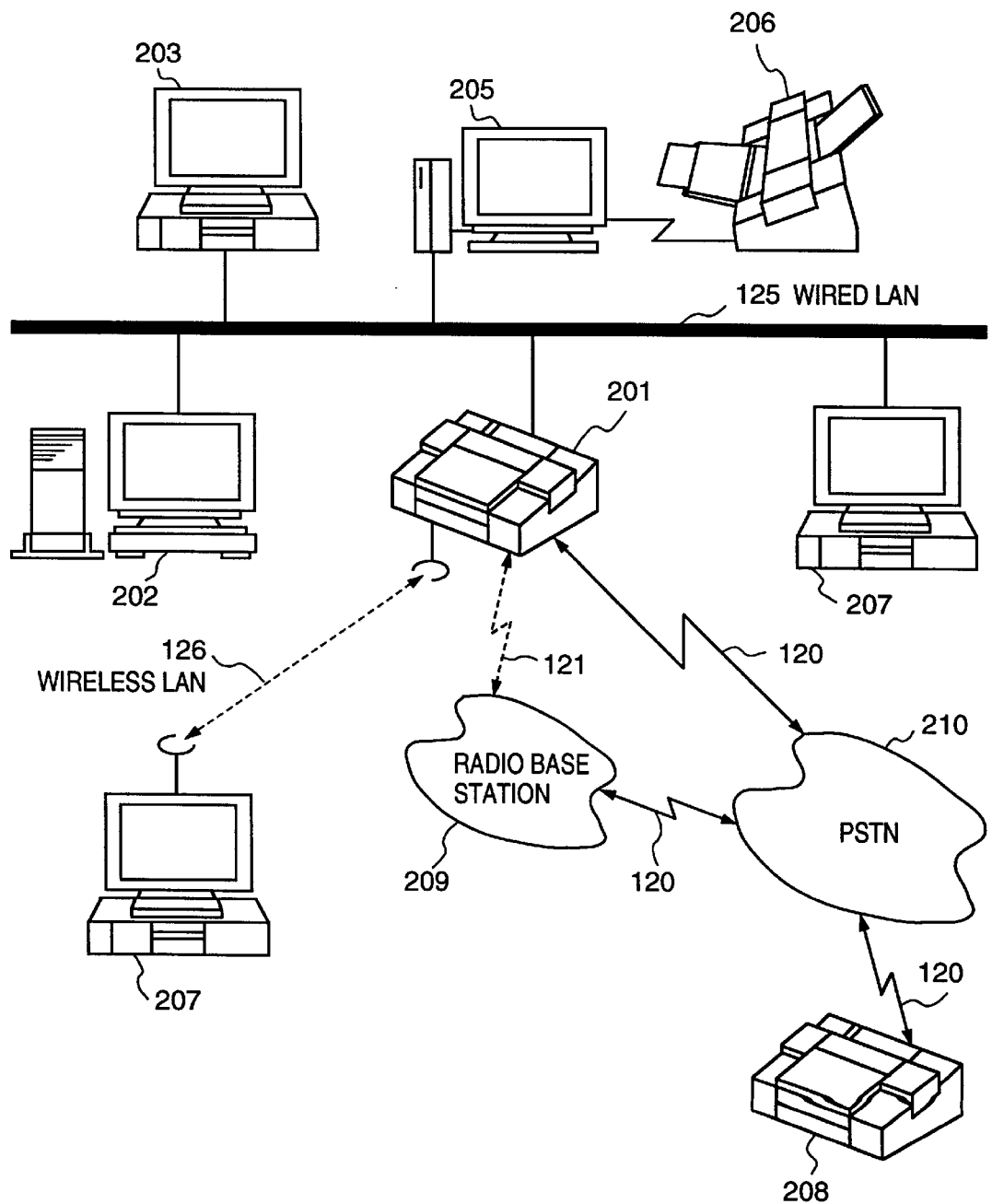
FIG. 2 is a diagram showing the connection pattern of the facsimile apparatus shown in FIG. 1.
Figure 3A:
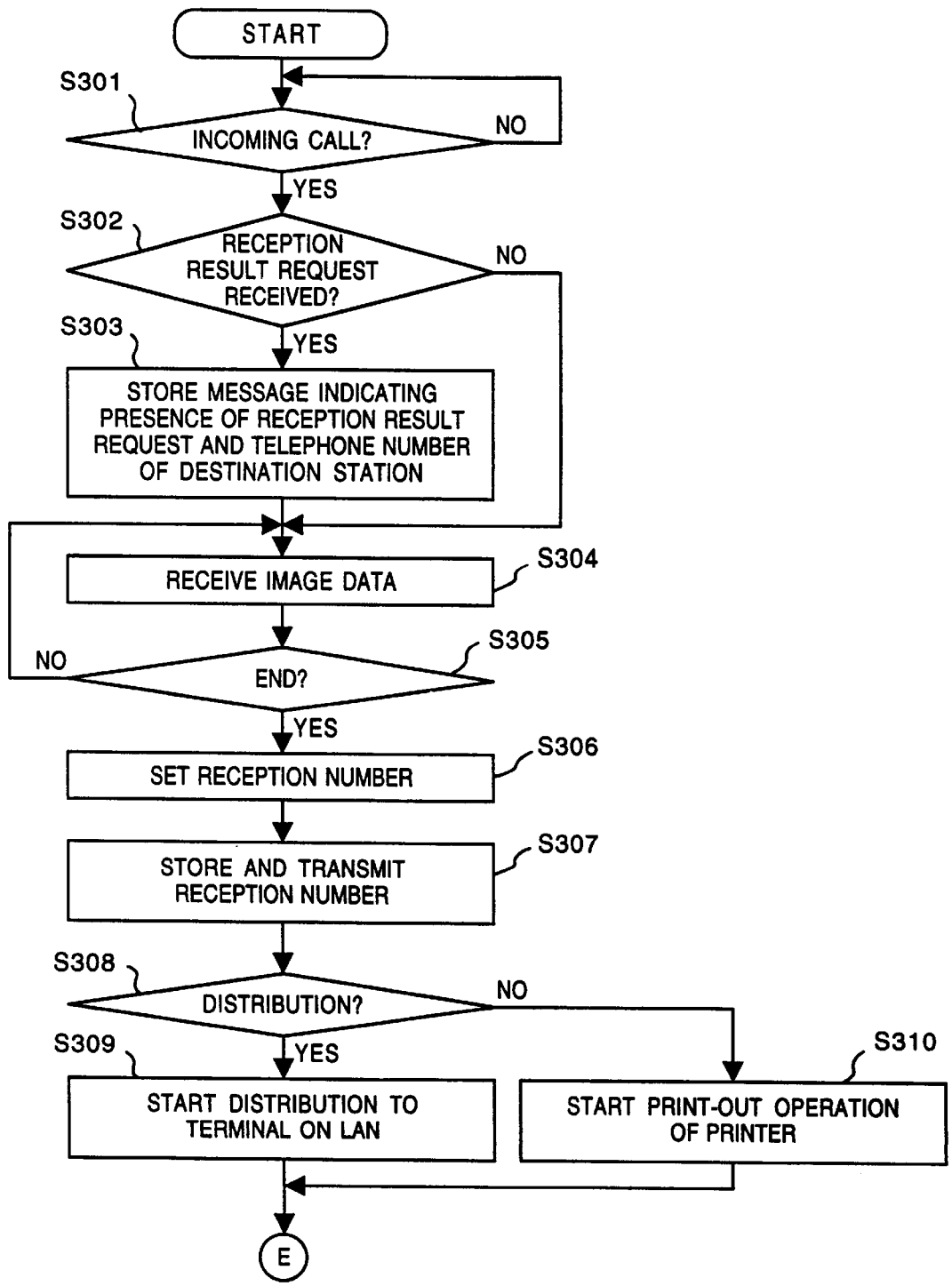
FIGS. 3A and 3B are flow charts showing the flow of processing associated with reception of image data.
Figure 3B:
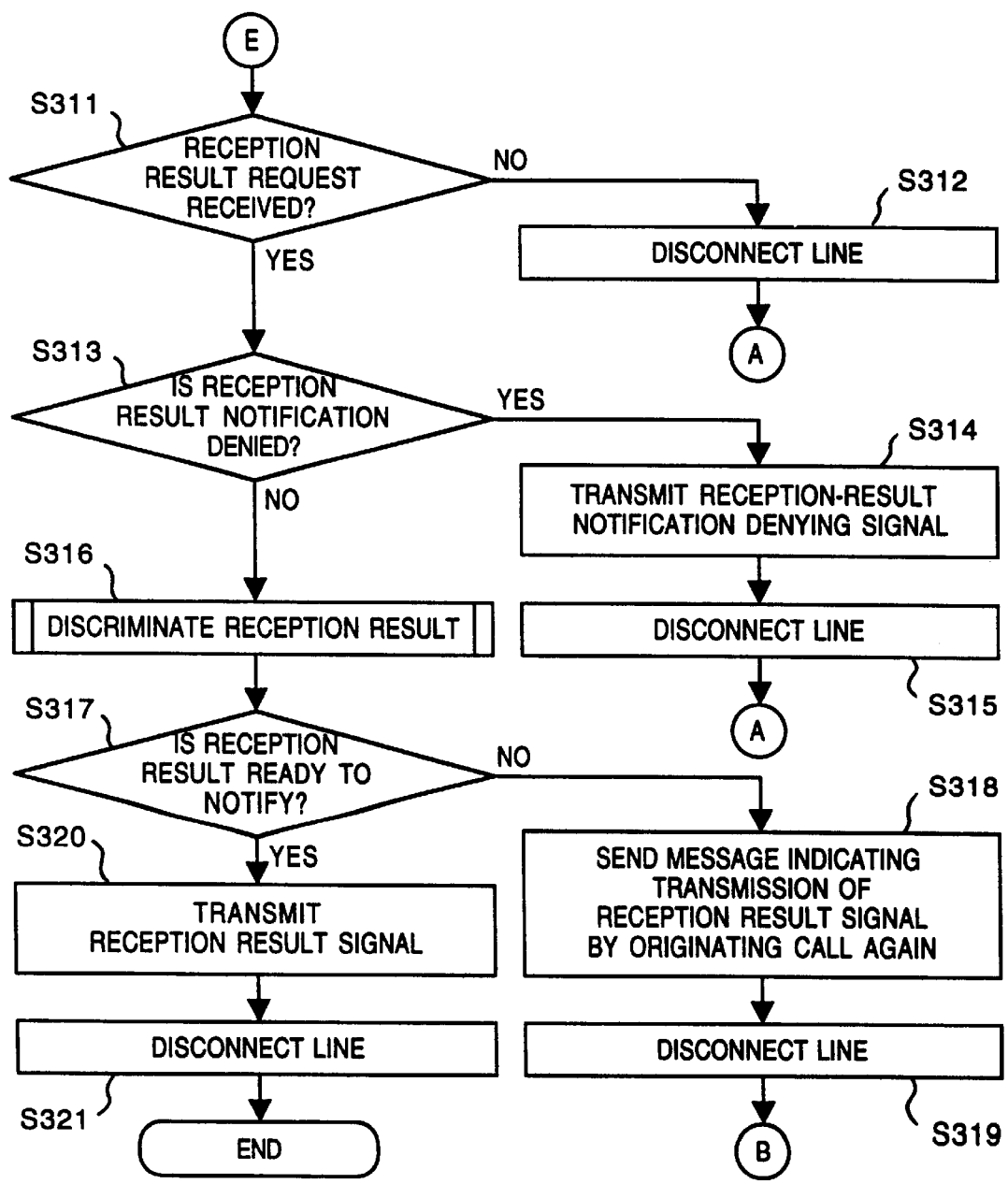

FIG. 2 shows the connection pattern of a system including the facsimile apparatus shown in FIG. 1. Referring to FIG. 2, reference numeral 201 denotes a facsimile apparatus shown in FIG. 1, which can be directly connected to the wired LAN 125 and the wireless LAN 126. Note that this embodiment exemplifies a case wherein the facsimile apparatus 201 is directly connected to the wired LAN 125. However, the present invention is not limited to this specific connection pattern, and a server machine may be connected between the facsimile apparatus 201 and the wired LAN 125.

Reference numeral 202 denotes a server machine of the LAN to which the facsimile apparatus 201 is connected, and manages the LAN and files on the LAN. Reference numerals 203 and 204 denote client machines (information processing terminals) connected to the wired LAN 125. Reference numeral 205 denotes a printer server for performing control for receiving print requests from these client machines and outputting them to a printer 206. Note that the printer 206 prints out an image on a recording sheet.

Reference numeral 207 denotes a client machine connected to the wireless LAN 126. Reference numeral 208 denotes a destination facsimile apparatus which communicates with the facsimile apparatus 201 via the wired communication line 120. Reference numeral 209 denotes a radio base station for performing communication control when the facsimile apparatus 201 performs communications via the wireless communication line 121.

Reference numeral 210 denotes a PSTN (Public Switched Telephone Network). The facsimile apparatus 201 and the radio base station 209 are connected to the PSTN 210 via the wired communication line 120. Reference numeral 126 denotes a wireless LAN constituted by the facsimile apparatus 201 having the wireless LAN i/f 123 and the client machine 207. Reference numeral 121 denotes a wireless communication line for connecting the facsimile apparatus 201 and the radio base station 209 via the wireless line i/f 118.

The flow of processing executed when the facsimile apparatus 201 receives image data sent from a transmitting apparatus will be described below with reference to the flow charts shown in FIGS. 3A and 3B to 7. Note that these flow charts are based on the program stored in the ROM 102. Also, the wired LAN 125 and the wireless LAN 126 will be generally referred to as a LAN hereinafter.

It is monitored in step S301 if an incoming call is detected. If YES in step S301, transmission/reception of protocol signals based on ITU-T recommendation T.30 is started. In this step, the facsimile apparatus notifies, using an NSF signal, a transmitting apparatus that the apparatus itself is a facsimile apparatus connected to the LAN and has a function of notifying reception result (to be described later). It is checked in step S302 based on the contents of an NSS signal if the transmitting apparatus requests a receiving apparatus to transmit a reception result signal. If YES in step S302, a message indicating that the reception result request is received (also, the time if it is designated) and the destination number associated with the transmitting apparatus which is determined based on a TSI signal (together with the transmitter ID if available) are stored in the RAM 103. Reception of image data is started in step S304, and is continued until the end of reception is detected in step S305. The received image data is stored in the image memory 104. Upon detecting the end of reception of image data in step S305, a reception number for specifying this received image data is set in step S306, the number is stored in the RAM 103 and the transmitting apparatus is notified of the number in step S307. Note that this reception number is stored in correspondence with data stored in step S303 and image data (address) stored in the image memory 104. Alternatively, the reception number may be transmitted from the transmitting apparatus. In this case, the reception number transmitted from the transmitting apparatus is received and stored in the RAM 103.

It is checked in step S308 if the received image data is to be distributed to a terminal or terminals on the LAN. In this case, the data is distributed when the transmitting apparatus transmits data while designating a terminal to which the data is to be distributed or when the receiving apparatus is set in an automatic distribution mode. On the other hand, the data is not distributed in cases other than the above-mentioned cases or in a case where, for example, data cannot be distributed since a distribution destination terminal has not logged in. Note that the distribution may be performed by an operator's operation. When the data is to be distributed, a message indicating reception of an incoming call is supplied to the desired terminal on the LAN, and thereafter, the received image data is distributed in step S309. When the data is not or cannot be distributed, the received image data is printed out using the printer 115 in step S310. If the image data cannot be printed out due to, e.g., absence of recording sheets in the printer 115 in step S310, the received image data is left stored in the image memory 104.

It is checked in step S311 based on the contents of the RAM 103 if a transmission request of the reception result signal has been received from the transmitting apparatus. If NO in step S311, the line is disconnected in step S312. However, if YES in step S311, the flow advances to step S313 to check if transmission of the reception result signal is to be denied. Assume that data indicating whether or not transmission is to be denied is registered in advance in the RAM 103 upon operation using the operation unit 112. If transmission is denied, the flow advances to step S314, and a signal indicating that transmission of the reception result signal is denied is transmitted to the transmitting apparatus. Thereafter, the line is disconnected in step S315. If transmission of the reception result signal is not denied, the reception result is checked in step S316, and it is checked in step S317 if the apparatus is ready to transmit the reception result signal. If NO in step S317, a signal indicating that the apparatus will originate a call later to transmit the reception result signal is sent to the transmitting apparatus in step S318, and the line is disconnected in step S319. On the other hand, if YES in step S317, the reception result signal based on the reception result discriminated in step S316 is transmitted to the transmitting apparatus in step S320, and the line is disconnected in step S321.

The reception-result notification function will be explained below. With this function, it is capable of discriminating the state (indicating whether or not reception normally ended, data could be printed out, a terminal or terminals on the LAN were notified of reception, received data was distributed to a terminal or terminals on the LAN, and a terminal or terminals on the LAN performed output processing) of data received by the receiving facsimile apparatus and the state (indicating whether or not a terminal with a designated ID is present on the LAN, and the terminal has logged in) of the terminal on the LAN by, e.g., inquiring of the server machine 202, and transmits the discriminated information to the transmitting apparatus as the reception result signal.

Normally, the reception result notification is given using a call different from that for data reception. When the receiving apparatus calls to notify the reception result, the notification is made based on the telephone number received from the transmitting apparatus upon reception of data. On the other hand, when the reception result is notified in response to a call originated by the transmitting apparatus, the above-mentioned information discriminated by the receiving apparatus is stored in the RAM 103, and is output in accordance with a request from the transmitting apparatus. The reception result signal includes the following information: ID data (indicating the user on the LAN on the transmitting side) if a transmitter ID is available, starting date & time of data transmission, a telephone number of the receiving facsimile apparatus, a receiver ID (indicating the user on the LAN on the receiving side), the state of the received data, the transition time of the state of the received data, the state of a receiver, and the like.

Figure 4:
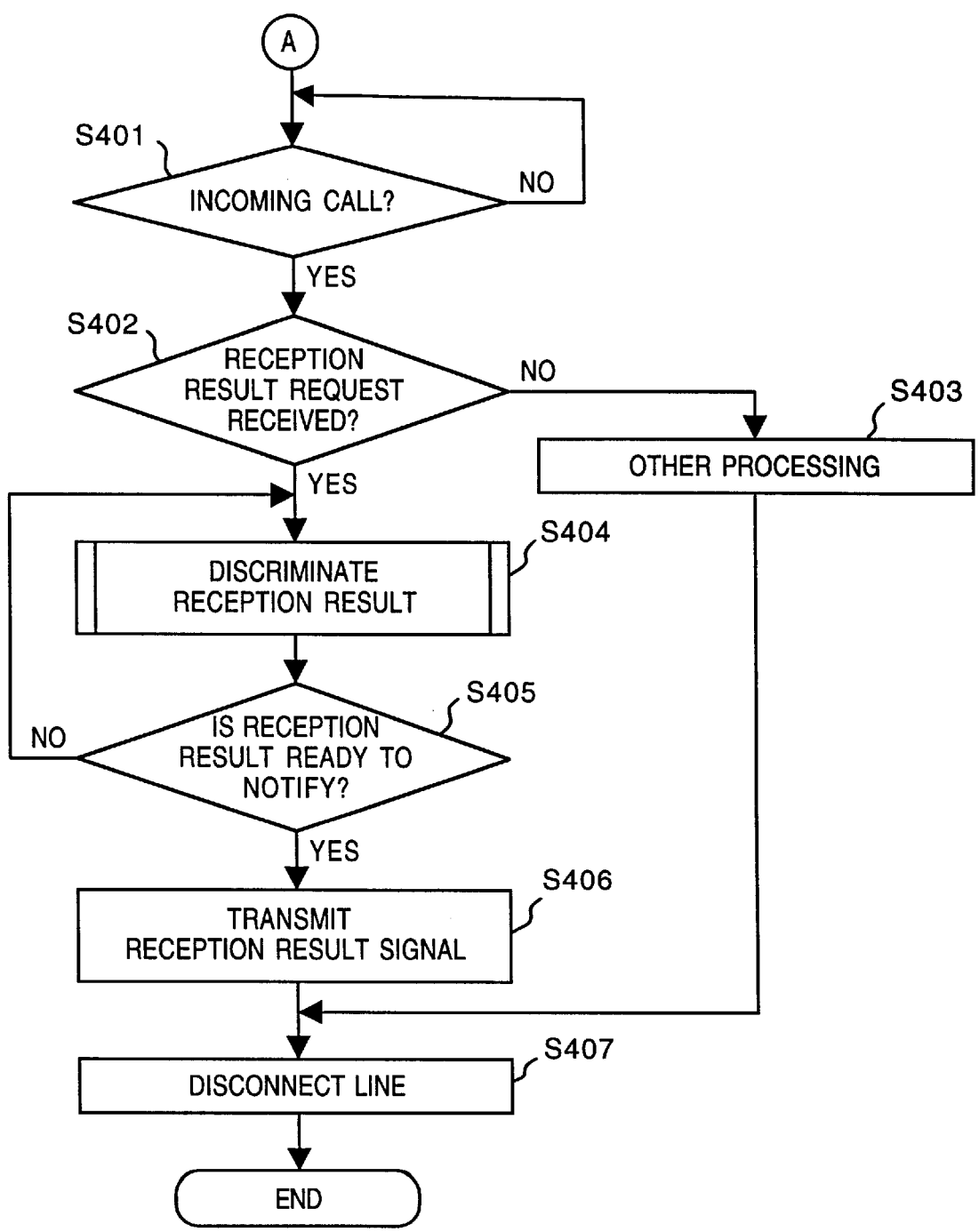
FIG. 4 is a flow chart showing the flow of reception result confirmation processing in response to a call re-originated by the transmitting side.

After the line is disconnected in step S312 or S315, the flow advances to step S401 shown in FIG. 4. It is monitored in step S401 if an incoming call is detected. If YES in step S401, it is checked in step S402, based on an NSS signal, if the incoming call is associated with the reception result request. If NO in step S402, other processing is performed in step S403. On the other hand, if YES in step S402, the reception result is discriminated in step S404 based on the reception number stored in the RAM 103, and the control waits in step S405 until the apparatus becomes ready to transmit the reception result signal. In step S406, the reception result signal is transmitted. In step S407, the line is disconnected.

Figure 5:
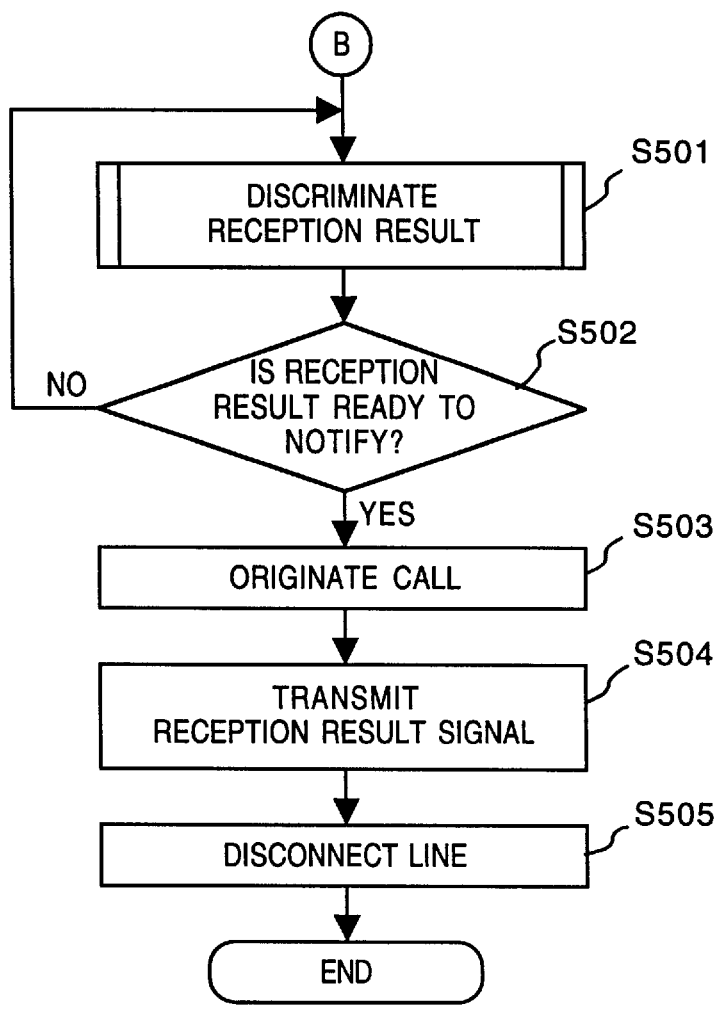
FIGS. 5 and 8 are flow charts showing the flow of reception result notification processing in response to a call originated by the receiving side.

After the line is disconnected in step S319, the flow advances to step S501 in FIG. 5. In step S501, the reception result is discriminated on the basis of the reception number stored in the RAM 103, and the control waits in step S502 until the apparatus becomes ready to transmit the reception result signal. If the apparatus is ready to transmit the reception result signal, the apparatus originates a call in step S503 based on the destination number stored in the RAM 103, and transmits the reception result signal in step S504 based on the reception result discriminated in step S501. Then, the line is disconnected in step S505.

Figure 6:
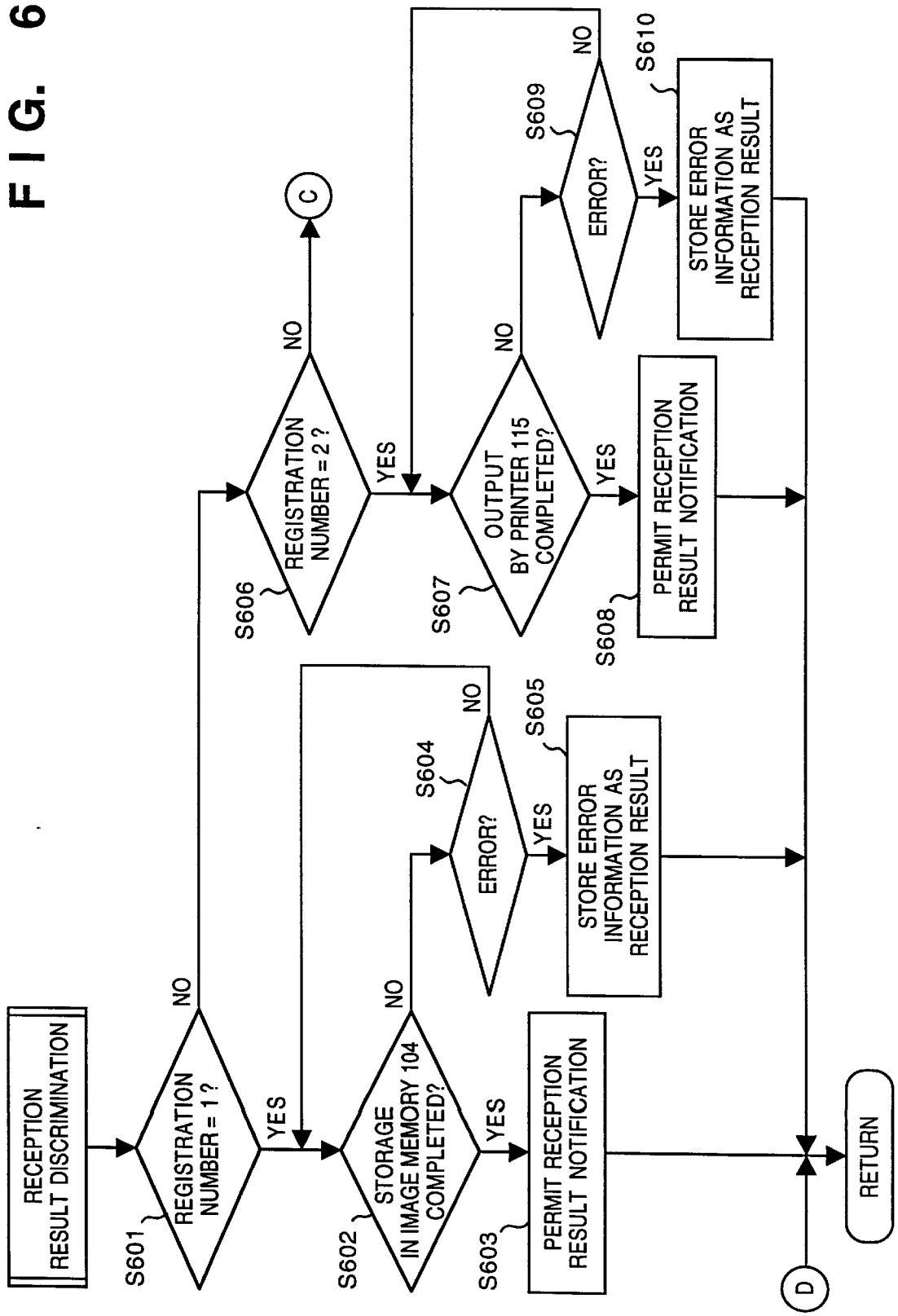
FIGS. 6 and 7 are flow charts showing the reception result discrimination routine.

The reception result discrimination processings in steps S310, S404, and S501 will be described below with reference to the flow charts shown in FIGS. 6 and 7.

The contents of information of which the transmitting apparatus is to be notified as the reception result can be registered in the RAM 103 by operating the operation unit 112 of the facsimile apparatus 201 on the receiving side. In this case, information to be used as the reception result is stored in the ROM 102 in advance, in correspondence with registration numbers 1 to 5, and a registration number selected by the operator is registered in the RAM 103, so that desired information can be used as the reception result. In this embodiment, information as the reception result corresponding to registration number 1 indicates that received image data has been normally stored in the image memory 104 is stored. Registration number 2, indicating that received image data has been normally printed out by the printer 115; registration number 3, indicating that a terminal on the LAN has already been notified of reception of image data; registration number 4, indicating that received data has already been distributed to a terminal or terminals on the LAN; and registration number 5, indicating that data has already been read out from the memory of a terminal on the LAN.

It is checked in step S601 if the registration number is 1. If YES in step S601, the flow advances to step S602 to check if the received image data has already been stored in the image memory 104. If YES in step S602, the flow advances to step S603. In step S603, completion of the storage is stored in the RAM 103 as the reception result, and a flag is set for indicating that the reception result notification is permitted. On the other hand, if NO in step S602, the flow advances to step S604 to check if an error has occurred. If NO in step S604, control waits for the end of the storage; otherwise, in step S605, error occurrence information is stored in the RAM 103 as the reception result, and a flag indicating that the reception result notification is permitted is set.

If it is determined in step S601 that the registration number is not 1, the flow advances to step S606 to check if the registration number is 2. If YES in step S606, the flow advances to step S607 to check if the received image data has been printed out by the printer 115. If YES in step S607, the flow advances to step S608. In step S608, completion of the print-out operation is stored in the RAM 103 as the reception result, and a flag indicating that the reception result notification is permitted is set. On the other hand, if NO in step S607, the flow advances to step S609 to check if an error has occurred due to absence of paper sheets, paper jam, or the like. If NO in step S609, the control waits for completion of the print-out operation; otherwise, in step S610, the error occurrence information is stored in the RAM 103 as the reception result, and a flag indicating that the reception result notification is permitted is set in step S610.

Figure 7:
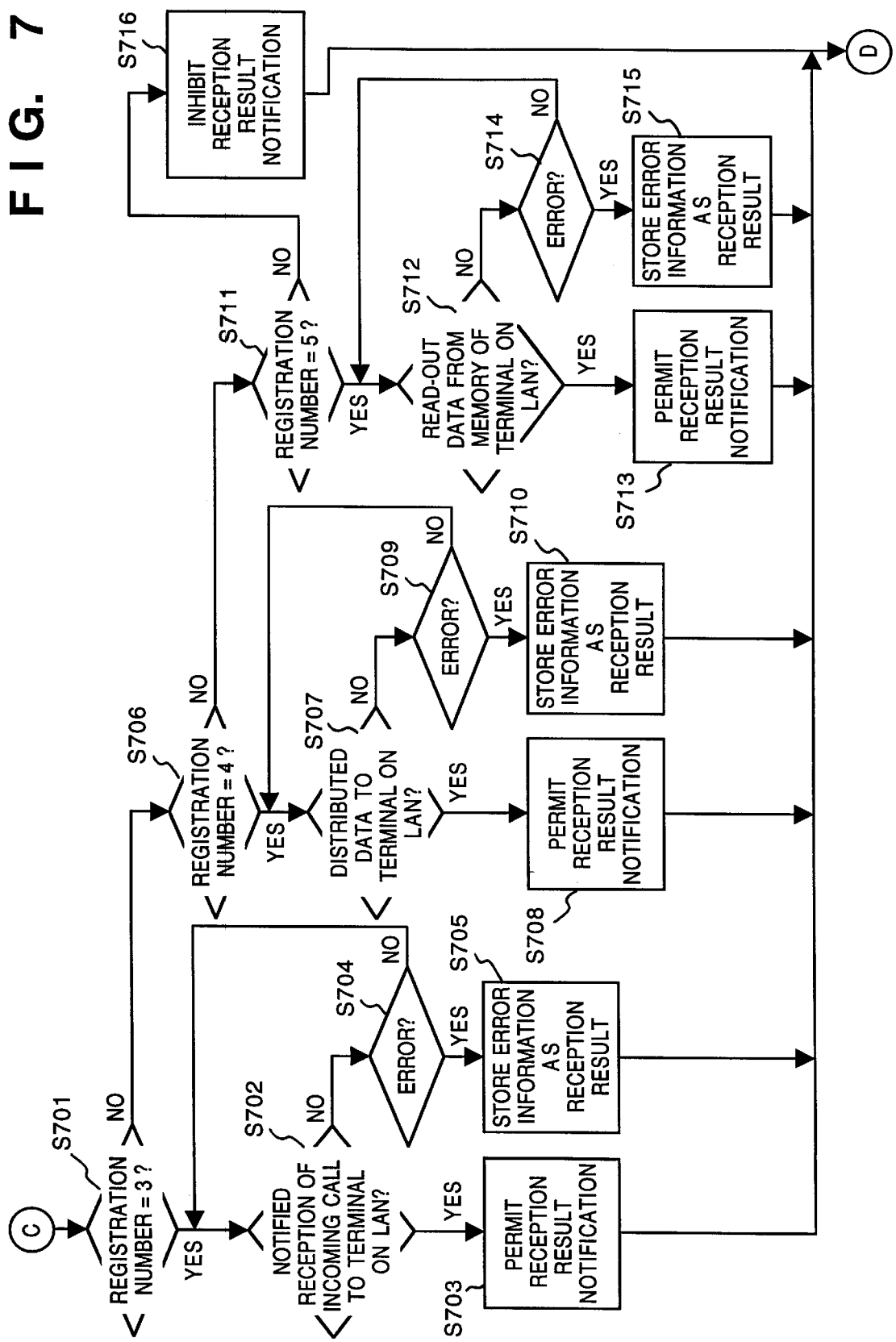

If it is determined in step S606 that the registration number is not 2, the flow advances to step S701 in FIG. 7 to check if the registration number is 3. If YES in step S701, the flow advances to step S702 to check if a terminal on the LAN has been notified of the reception of an incoming call. If YES in step S702, the flow advances to step S703. In step S703, completion of the notification is stored in the RAM 103 as the reception result, and a flag indicating that the reception result notification is permitted is set. On the other hand, if NO in step S702, the flow advances to step S704 to check if an error has occurred. If NO in step S704, the control waits for completion of the notification; otherwise, in step S705 the error occurrence information is stored in the RAM 103 as the reception result and a flag indicating that the reception result notification is permitted is set.

If it is determined in step S701 that the registration number is not 3, the flow advances to step S706 to check if the registration number is 4. If YES in step S706, the flow advances to step S707 to check if the received image data has been distributed to a terminal or terminals on the LAN. Note that completion of the distribution is determined when the data is normally stored in the memory of the destination terminal on the LAN. If YES in step S707, the flow advances to step S708. In step S708, completion of the distribution is stored in the RAM 103 as the reception result, and a flag indicating that the reception result notification is permitted is set. On the other hand, if NO in step S707, the flow advances to step S709 to check if an error has occurred due to, e.g., the state that a memory of the destination terminal on the LAN is full. If NO in step S709, the control waits for completion of the distribution; otherwise, in step S710, the error occurrence information is stored in the RAM 103 as the reception result and a flag indicating that the reception result notification is permitted is set.

If it is determined in step S706 that the registration number is not 4, the flow advances to step S711 to check if the registration number is 5. If YES in step S711, the flow advances to step S712 to check if the distributed image data has been read out from the memory of a terminal on the LAN. Note the fact that the data is read out from the memory of the terminal on the LAN indicates that the operator has confirmed the terminal on the LAN displays the distributed image data on a display or prints out the data using a printer apparatus. If YES in step S712, the flow advances to step S713. In step S713, completion of the read-out operation of the data is stored in the RAM 103 as the reception result and a flag indicating that the reception result notification is permitted is set. If NO in step S712, the flow advances to step S714 to check if an error has occurred. If NO in step S714, the control waits for completion of the read-out operation of the data from the memory; otherwise, in step S714, the error occurrence information is stored in the RAM 103 as the reception result and a flag indicating that the reception result notification is permitted is set.

On the other hand, if it is determined in step S711 that the registration number is not 5, it indicates that the registration number is not normally registered due to, e.g., a registration error, and the reception result notification is inhibited in step S716.

In the above description, the receiving apparatus stores the types of reception results of which a destination station is to be notified. Alternatively, the above-mentioned five different reception results (corresponding to the registration numbers) may be stored in the RAM 103, and the reception result corresponding to a request from the transmitting apparatus may be selectively notified.

On the other hand, if a state does not reach the state which corresponds to the registered registration number, a state of the user (terminal) on the LAN is notified.

According to the above-mentioned facsimile apparatus 201, upon reception of the reception result request from the transmitting apparatus, the reception result information can be notified.

At this time, if the reception result can be identified (YES in step S317 in FIG. 3B) while a line is seized, the transmitting apparatus can be notified of the reception result while the line is kept seized. Then, the receiving apparatus is not charged a fee for an additional call.

Since the destination number associated with the transmitting apparatus and the reception number of the received data are stored in correspondence with each other, the receiving apparatus is capable of calling the transmitting apparatus to notify it of the reception result after the line is disconnected, and the image data can be easily specified by the reception number.

Furthermore, since the receiving apparatus can deny notification of the reception result, it can be prevented from being unnecessarily charged. At this time, it is possible for the transmitting apparatus to recognize the reception result by originating a call again, which enables notification of the reception in accordance with a request from the transmitting apparatus.

With respect to the notification of the reception result which will be done by the data receiving apparatus by making another call, the notification is executed after the state of the received data has reached the pre-registered state as shown in FIG. 5. Alternatively, the notification may be executed when a time has reached a prescribed notification time.

Figure 8:
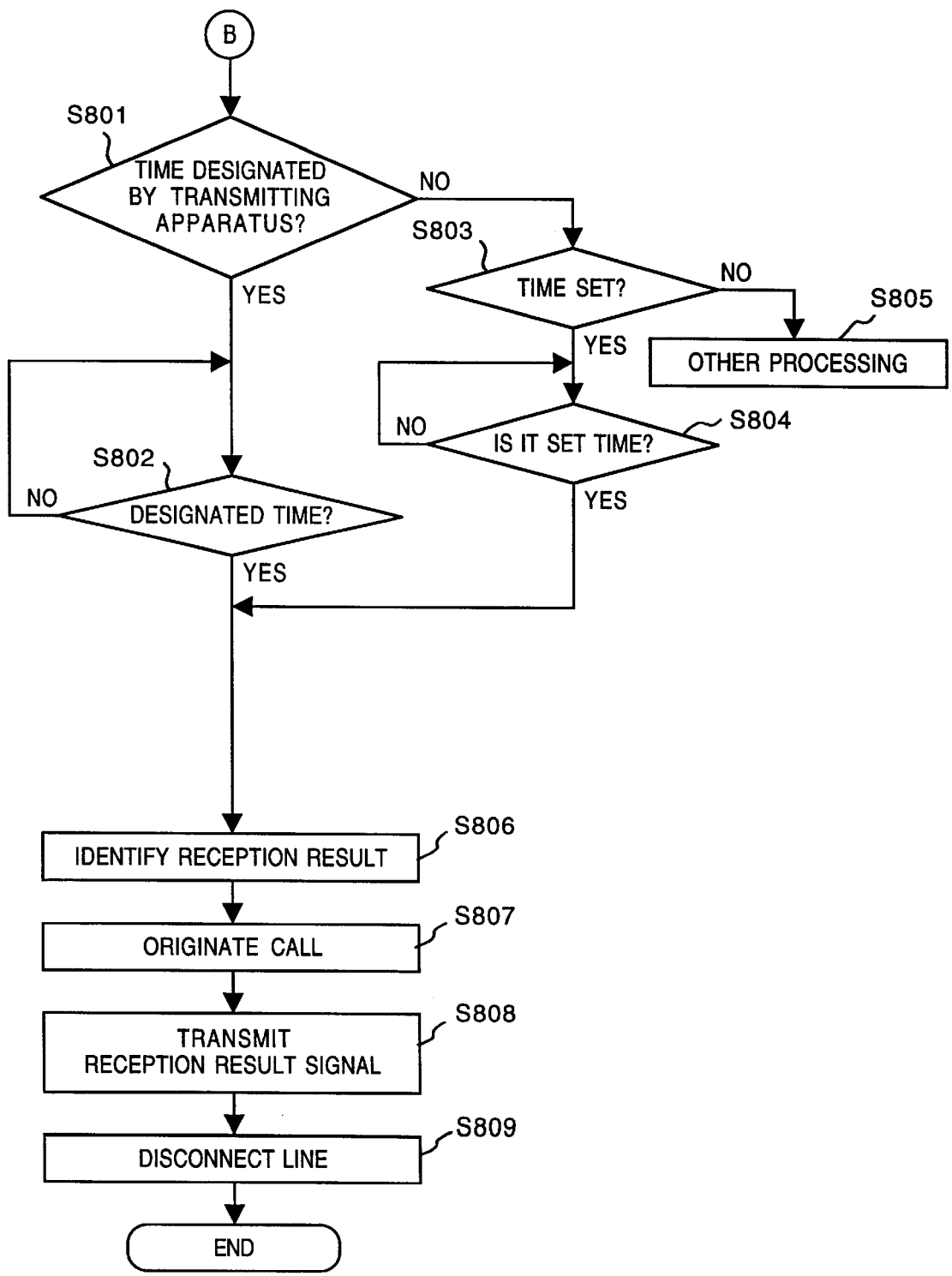

The flow of the processing using the prescribed notification time will be described below with reference to the flow chart shown in FIG. 8.

In step S801, it is checked if the reception result request received from the transmitting apparatus in step S302 includes time designation information. The time designation information may designate an actual time, or may designate a time period elapsed after an incoming call comes in or after a line is the disconnected, which are stored in the RAM 103. In step S802, it is checked if the designated time has been reached. If YES in step S802, the flow advances to step S806.

On the other hand, if the time designation information is not included in the request from the transmitting apparatus, the flow advances to step S803 to check if a time is set by the operation unit 112. In this case as well, an actual time or a time period elapsed after an incoming call comes in or after a line is disconnected may be set. The actual time or the time period is stored in the RAM 103. Alternatively, the transmitting apparatus may be notified of the set time in step S318. If the time is set, it is checked in step S804 if a time has reached the set time. If YES in step S804, the flow advances to step S806.

If NO is determined in steps S801 and S803, other processing is executed in step S805.

In step S806, the state of the received data and the state of the terminal on the LAN are discriminated by searching for data in the RAM 103, inquiring of the server machine 202, and so on.

In step S807, a call is originated based on the telephone number of the transmitting apparatus, which is stored in the RAM 103. In step S808, the reception result signal in dependent upon the information discriminated in step S806 is transmitted. Upon completion of the transmission, the line is disconnected in step S809.

According to the above-mentioned method, the reception result can be notified at a timing required by the transmitting or receiving apparatus independently of the state of the received data.

The flow charts shown in FIGS. 4 to 8 show the operation controlled by the CPU 101 on the basis of the program stored in the ROM 102. It is capable of storing data indicative of this program in a detachable magneto-optical disk, or the like, and performing the same control by another equipment that can interpret this data.

As many apparently widely different embodiments of the present invention can be made without departing from the spirit and scope thereof, it is to be understood that the invention is not limited to the specific embodiments thereof except as defined in the appended claims.

What is claimed is:

1. A data communication apparatus capable of being connected to a private network and a public network, comprising:

reception means for receiving data from a transmitting apparatus via the public network;

output means for outputting the data received by said reception means onto the private network;

identification means for identifying a processing result associated with an output operation of said output means;

determination means for determining whether or not a processing result notification request is received from the transmitting apparatus via the public network; and notification means for notifying the transmitting apparatus, via the public network, of the processing result identified by said identification means, when said determination means determines that the processing result notification request is received.

2. The apparatus according to claim 1, further comprising discrimination means for discriminating a destination associated with the transmitting apparatus, and wherein said notification means includes call-origination notification means for notifying the processing result identified by said identification means, by originating a call on the basis of the destination discriminated by said discrimination means.

3. The apparatus according to claim 2, further comprising refusing means for refusing notification by said call-origination notification means, and wherein said notification means notifies the processing result identified by said identification means in response to a call originated by the transmitting apparatus, when said refusing means refuses the notification.

4. The apparatus according to claim 1, wherein said notification means notifies the processing result identified by said identification means upon elapse of a predetermined period of time.

5. The apparatus according to claim 1, wherein said determination means determines whether or not the processing result notification request is received in accordance with a negotiation of a facsimile communication.

6. A data communication apparatus capable of being connected to a private network and a public network, comprising:

reception means for receiving data from a transmitting apparatus via the public network;

output means for outputting the data received by said reception means onto the private network;

identification means for identifying a processing result associated with an output operation of said output means;

disconnection means for disconnecting a line after the end of data reception by said reception means;

first notification means for notifying the processing result identified by said identification means in response to a call originated by the transmitting apparatus, after said disconnection means disconnects the line; and second notification means for notifying the processing result identified by said identification means by originating a call to the transmitting apparatus after said disconnection means disconnects the line.

7. The apparatus according to claim 6, further comprising selection means for selecting one of said first and second notification means on the basis of a negotiation with the transmitting apparatus.

8. The apparatus according to claim 6, further comprising setting means for setting information for specifying the data received by said reception means, and wherein said first and second notification means notify the processing result identified by said identification means, on the basis of the information set by said setting means.

9. A data communication method comprising:

the reception step of receiving data from a transmitting apparatus via a public network;

the output step of outputting the data received in the reception step onto a private network;

the identification step of identifying a processing result associated with an output operation in the output step;

the determination step of determining whether or not a processing result notification request is received from the transmitting apparatus via the public network; and the notification step of notifying the transmitting apparatus, via the public network, of the processing result identified in the identification step, when it is determined in the determination step that the processing result notification request is received.

10. The method according to claim 9, further comprising the discrimination step of discriminating a destination associated with transmitting apparatus, and wherein the notification step includes the call-origination notification step of notifying the processing result identified in the identification step, by originating a call on the basis of the destination discriminated in the discrimination step.

11. The method according to claim 10, further comprising the refusing step of refusing notification in the call-origination notification step, and wherein the notification step includes the step of notifying the processing result identified in the identification step in response to a call originated by the transmitting apparatus, when the notification is refused in the refusing step.

12. The method according to claim 9, wherein the notification step includes the step of notifying the processing result identified in the identification step upon elapse of a predetermined period of time.

13. The method according to claim 9, wherein said determination step determines whether or not the processing result notification request is received in accordance with a negotiation of a facsimile communication.

14. A data communication method comprising:

the reception step of receiving data from a transmitting apparatus via a public network;

the output step of the outputting data received in the reception step onto a private network;

the identification step of identifying a processing result associated with an output operation in the output step;

the disconnection step of disconnecting a line after the end of data reception by the reception step;

the first notification step of notifying the processing result identified in the identification step in response to a call originated by the transmitting apparatus, after the line is disconnected in the disconnection step; and the second notification step of notifying the processing result identified in the identification step by originating a call to the transmitting apparatus after the line is disconnected in the disconnection step.

15. The method according to claim 14, further comprising the selection step of selecting notification in one of the first and second notification steps on the basis of a negotiation with the transmitting apparatus.

16. The method according to claim 14, further comprising the setting step of setting information for specifying the data received in the reception step, and wherein each of the first and second notification steps includes the step of notifying the processing result identified in the identification step, on the basis of the information set in the setting step.

17. A data communication apparatus capable of being connected to a private network and a public network, comprising:

reception means for receiving data from a transmitting apparatus via the public network by seizing a communication line in a reception operation;

output means for outputting the data received by said reception means onto the private network;

identification means for identifying a processing result associated with an output operation of said output means;

notification means for notifying the transmitting apparatus via the public network of the processing result identified by said identification means; and determination means for determining whether or not said notification means is able to perform notification using the communication line seized in the reception operation, wherein, when said determination means determines that notification is able to be performed using the communication line seized in the reception operation, said notification means performs notification using the communication line seized in the reception operation, and, when said determination means determines that notification is not able to be performed using the communication line seized in the reception operation, said notification means disconnects the communication line seized in the reception operation, newly seizes a communication line in a second operation and performs notification using the communication line seized in the second operation.

18. The apparatus according to claim 17, further comprising setting means for setting a predetermined time, wherein when said determination means determines that notification is not able to be performed using the communication line seized in the reception operation, said notification means newly seizes a communication line after the predetermined time has passed after the communication line seized in the reception operation was disconnected.

19. The apparatus according to claim 17, wherein said output means distributes the data received by said reception means to a terminal on the private network.

20. The apparatus according to claim 19, wherein the processing result indicates that said output means has distributed the data.

21. A data communication method comprising the steps of:

receiving data from a transmitting apparatus via a public network by seizing a communication line in a reception operation;

outputting the data received at said reception step onto a private network;

identifying a processing result associated with an output operation of said output step;

notifying the transmitting apparatus via the public network of the processing result identified by said identification step; and determining whether or not said notification step is able to perform notification using the communication line seized in the reception operation, wherein, when said determination step determines that notification is able to be performed using the communication line seized in the reception operation, said notification step performs notification using the communication line seized in the reception operation, and, when said determination step determines that notification is not able to be performed using the communication line seized in the reception operation, said notification step disconnects the communication line seized in the reception operation, newly seizes a communication line in a second operation and performs notification using the communication line seized in the second operation.

22. The method according to claim 21, further comprising the setting step of setting a predetermined time, wherein when said determination step determines that notification is not be able to be performed using the communication line seized in the reception operation, said notification step newly seizes a communication line after the predetermined time has passed after the communication line seized in the reception operation was disconnected.

23. The method according to claim 21, wherein, in said output step, the data received at said reception step is distributed to a terminal on the private network.

24. The method according to claim 23, wherein the processing result indicates that the data has been distributed in said output step.

25. A computer readable storage medium containing a program for causing a data communication apparatus to perform a method, said method comprising the steps of:

receiving data from a transmitting apparatus via a public network;

outputting the data received at said reception step onto a private network;

identifying a processing result associated with an output operation of said output step;

determining whether or not a processing result notification request is received from the transmitting apparatus via the public network; and notifying the transmitting apparatus via the public network of the processing result identified at said identification step, when said determination step determines that the processing result notification request is received.

26. A computer readable storage medium containing a program for causing a data communication apparatus to perform a method, said method comprising:

a reception step of receiving data from a transmitting apparatus via a public network;

an output step of outputting the data received at said reception step onto a private network;

an identification step of identifying a processing result associated with an output operation of said output step;

a disconnection step of disconnecting a line after an end of data reception at said reception step;

a first notification step of notifying the transmitting apparatus of the processing result identified at said identification step in response to a call originated by the transmitting apparatus, after the line is disconnected in said disconnection step; and a second notification step of notifying the transmitting apparatus of the processing result identified at said identification step by originating a call to the transmitting apparatus after the line is disconnected in said disconnection step.

27. A computer readable storage medium containing a program for causing a data communication apparatus to perform a method, said method comprising the steps of:

receiving data from a transmitting apparatus via a public network by seizing a communication line in a reception operation;

outputting the data received at said reception step onto a private network;

identifying a processing result associated with an output operation of said output step;

notifying the transmitting apparatus via the public network of the processing result identified by said identification step; and determining whether or not said notification step is able to perform notification using the communication line seized in the reception operation, wherein, when said determination step determines that notification is able to be performed using the communication line seized in the reception operation, said notification step performs notification using the communication line seized in the reception operation, and, when said determination step determines that notification is not be able to be performed using the communication line seized in the reception operation, said notification step disconnects the communication line seized in the reception operation, newly seizes a communication line in a second operation and performs notification using the communication line seized in the second operation.

* * * * *

UNITED STATES PATENT AND TRADEMARK OFFICE
CERTIFICATE OF CORRECTION

PATENT NO. : 5,887,142

DATED : March 23, 1999

INVENTOR(S) : SEIJI OMORI, ET AL.

It is certified that error appears in the above-identified patent and that said Letters Patent is hereby corrected as shown below:

<u>COLUMN 11</u>

Line 19, "be able" should read --able--;
    Line 29, "be able" should read --able--; and
    Line 63, "be able" should read --able--.

<u>COLUMN 12</u>

Line 6, "be able" should read --able--.

<u>COLUMN 14</u>

Line 1, "be able" should read --able--.

Signed and Sealed this

Sixteenth Day of November, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO.   : 5,887,142
DATED        : March 23, 1999
INVENTOR(S)  : Seiji Omori, et al It is certified that error appears in the above-identified patent and that said Letters Patent is hereby corrected as shown below:

On the title page, item

[30] FOREIGN APPLICATION PRIORITY DATA

"Jul. 13, 1995" should read --Jul. 31, 1995--.

Signed and Sealed this

First Day of February, 2000

Attest:

Q. TODD DICKINSON

Attesting Officer

Acting Commissioner of Patents and Trademarks